US011853843B2

(12) United States Patent
Farahat et al.

(10) Patent No.: US 11,853,843 B2
(45) Date of Patent: Dec. 26, 2023

(54) AUTHENTICATION SYSTEM

(71) Applicant: Sun Chemical Corporation, Parsippany, NJ (US)

(72) Inventors: Mohammad Farahat, Wyckoff, NJ (US); Jessica Blatt, Hoboken, NJ (US); Sidney Persley, Huntersville, NC (US); Charles Achkar, Cresskill, NJ (US); Stephen Postle, Glen Rock, NJ (US); Danny Rich, Trenton, NJ (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 17/953,620

(22) Filed: Sep. 27, 2022

(65) Prior Publication Data
US 2023/0050173 A1 Feb. 16, 2023

Related U.S. Application Data

(63) Continuation of application No. 16/012,848, filed on Jun. 20, 2018, now abandoned.

(60) Provisional application No. 62/062,425, filed on Oct. 10, 2014.

(51) Int. Cl.
| G06K 7/14 | (2006.01) |
| G06F 21/34 | (2013.01) |
| G06F 21/36 | (2013.01) |
| G06F 21/10 | (2013.01) |
| G06Q 50/18 | (2012.01) |
| A47J 31/44 | (2006.01) |
| G06Q 30/018 | (2023.01) |

(52) U.S. Cl.
CPC .......... *G06K 7/143* (2013.01); *A47J 31/4492* (2013.01); *G06F 21/10* (2013.01); *G06F 21/34* (2013.01); *G06F 21/36* (2013.01); *G06Q 50/184* (2013.01); *G06Q 30/0185* (2013.01)

(58) Field of Classification Search
CPC ...... G06K 7/143; A47J 31/4492; G06F 21/10; G06F 21/34; G06F 21/36; G06Q 50/184; G06Q 30/0185; Y02A 90/10
USPC .......................................... 235/380
See application file for complete search history.

(56) References Cited

U.S. PATENT DOCUMENTS

| 4,756,557 | A | 7/1988 | Kaule |
| 5,842,603 | A | 12/1998 | Schroeder |
| 5,903,340 | A | 5/1999 | Lawandy |
| 5,941,572 | A | 8/1999 | Gundjian |
| 5,974,150 | A | 10/1999 | Kaish |
| 5,974,950 | A | 11/1999 | King |
| 6,005,960 | A | 12/1999 | Moore |
| 6,354,501 | B1 | 3/2002 | Outwater |
| 6,402,986 | B1 | 6/2002 | Jones, II |

(Continued)

OTHER PUBLICATIONS

International Search Report issued in PCT Application PCT/US2015/054995, dated Feb. 1, 2016.

(Continued)

*Primary Examiner* — Jacob Lipman
(74) *Attorney, Agent, or Firm* — Luke Sande

(57) ABSTRACT

The present invention is directed to an authenticating apparatus, system and a method for authentication of an object or product having a secure glyph thereon. The invention is also directed to the use of the object or product in a machine wherein the secure glyph has an intellectual property protected feature and a machine readable feature.

15 Claims, 14 Drawing Sheets

4-Fold Rotational Symmetry Trademark

(56) References Cited

U.S. PATENT DOCUMENTS

| | | | |
|---|---|---|---|
| 6,701,304 B2 | 3/2004 | Leon | |
| 6,993,655 B1 | 1/2006 | Hecht | |
| 7,079,230 B1 | 7/2006 | McInerney | |
| 7,325,479 B2 | 2/2008 | Laigneau | |
| 7,488,954 B2 | 2/2009 | Ross | |
| 7,620,527 B1 | 11/2009 | Giellis | |
| 8,194,914 B1 | 6/2012 | Skogg et al. | |
| 8,403,223 B2 | 3/2013 | Lewis et al. | |
| 2002/0025490 A1 | 2/2002 | Shchegolikhin | |
| 2002/0048621 A1 | 4/2002 | Boyd | |
| 2002/0134831 A1 | 9/2002 | Saveliev | |
| 2002/0135768 A1 | 9/2002 | Sugiyama | |
| 2002/0143860 A1 | 10/2002 | Catan | |
| 2003/0006281 A1 | 1/2003 | Thomas | |
| 2003/0035564 A1 | 2/2003 | Honsinger | |
| 2003/0039195 A1 | 2/2003 | Long | |
| 2003/0063772 A1 | 4/2003 | Smith | |
| 2003/0195820 A1 | 10/2003 | Silverbrook | |
| 2003/0218739 A1 | 11/2003 | Saglimbeni | |
| 2004/0079807 A1 | 4/2004 | Lapstun | |
| 2004/0112962 A1* | 6/2004 | Farrall | G07D 7/2033 235/462.01 |
| 2004/0120861 A1 | 6/2004 | Petroff | |
| 2004/0188528 A1 | 9/2004 | Alasia | |
| 2004/0231554 A1 | 11/2004 | Udagawa et al. | |
| 2005/0015348 A1 | 1/2005 | Knepler | |
| 2005/0060171 A1 | 3/2005 | Molnar | |
| 2005/0087610 A1* | 4/2005 | Adams | G06K 7/1417 235/494 |
| 2006/0163354 A1 | 7/2006 | Tyranski | |
| 2006/0180792 A1 | 8/2006 | Ricci | |
| 2007/0111315 A1 | 5/2007 | Maruvada | |
| 2007/0161115 A1 | 7/2007 | Schwartz | |
| 2007/0215239 A1 | 9/2007 | Dorney | |
| 2008/0025594 A1 | 1/2008 | Metzger | |
| 2009/0072526 A1 | 3/2009 | Peters et al. | |
| 2009/0141961 A1 | 6/2009 | Smith | |
| 2009/0231572 A1 | 9/2009 | Emerich | |
| 2010/0025476 A1 | 2/2010 | Widzinski, Jr. | |
| 2010/0067056 A1 | 3/2010 | Rich | |
| 2010/0149531 A1* | 6/2010 | Tang | G01J 3/02 250/459.1 |
| 2011/0170145 A1 | 7/2011 | Govyadinox et al. | |
| 2011/0260828 A1 | 10/2011 | Zhang | |
| 2012/0205449 A1 | 8/2012 | Lewis | |
| 2012/0261606 A1 | 10/2012 | Hollman | |
| 2013/0026239 A1 | 1/2013 | Sakahashi et al. | |
| 2013/0048874 A1 | 2/2013 | Rapoport | |
| 2013/0284029 A1 | 10/2013 | Reed et al. | |
| 2013/0301870 A1 | 11/2013 | Mow et al. | |
| 2014/0197192 A1 | 7/2014 | Atkins et al. | |
| 2014/0231448 A1 | 8/2014 | Wegelin | |
| 2015/0201790 A1 | 7/2015 | Smith | |
| 2016/0174757 A1 | 6/2016 | Rivera | |

OTHER PUBLICATIONS

Written Opinion issued in PCT Application PCT/US2015/054995, dated Feb. 1, 2016.
Supplementary Search Report issued in European Counterpart Application 15 84 8238, dated Feb. 23, 2018.

* cited by examiner

AUTHENTICATION SYSTEM

CROSS REFERENCE TO RELATED APPLICATIONS

This application claims priority to U.S. Provisional Patent Application Ser. No. 62/062,425 filed Oct. 10, 2014, which is incorporated herein by reference in its entirety and for all purposes.

FIELD OF THE INVENTION

The present invention is directed to an authenticating apparatus, system and a method for authentication of an object or product having a secure glyph thereon, wherein the secure glyph has an intellectual property protected feature and a machine readable feature. The invention is also directed to the use of the object or product having a secure glyph thereon in a machine or device.

BACKGROUND OF THE INVENTION

Systems and methods have been employed to prevent or reduce counterfeiting, infringement and the parallel importing of objects and products carrying a valuable piece of intellectual property, such as a company name, logo, image, brand, copyright or trademark.

Most systems and methods contain one or more protection features in the form of security or authentication measures classified into three types of object or product authenticity protection, each offering a different level of security. These are referred to in the security industry as a "Level 1" (readable by an ordinary citizen), Level 2" (machine-readable with immediate response) and "Level 3" (machine readable with dedicated tools where the response is not readily obtainable in real time, or other forensic means) security measures.

A Level 1 security measure involves the use of features that can be recognized overtly, e.g. by sight or touch by an end user of the object or product. Such features include holograms and markings by optically variable ink. In the case of a hologram, one is looking for a specially designed holographic pattern and in the case of an optically variable ink, the marked pattern shows different colors when viewed at different angles.

A Level 2 security measure involves the use of covert or semi-covert features that require interrogation by a simple and easily obtainable detection device. Examples include printed sectors in banknotes bearing fluorescent marks made from inks containing downconverter and upconverter taggants. In this case, one only needs an ultraviolet or infra-red laser interrogation source for verification of an object or product having the ink applied. When light in an appropriate waveband is illuminated onto the ink containing taggant, due to the taggant, the ink will emit visible light, which can be observed readily by the naked-eye. Alternatively, the ink may, due to the taggant, emit radiation of a wavelength invisible to the naked-eye, but readable and verifiable by a suitable reader.

Finally, a Level 3 security measure involves the use features that are generally known only to the brand or currency manufacturer of an object or product and can be verified, usually not in real time, by dedicated interrogation tools that cannot be readily obtained commercially in the marketplace.

US 2010/0149531 is directed to a Level 2 authentication measure and describes an authentication method for an object or product containing an image, where the image contains or forms part of a taggant used in a coded readable security feature. The coded readable feature is subject to an authentication process that identifies and verifies the object or product. However, because the taggant represents the only source of the identification and authentication security feature, and given that the machine readable security feature of the image is coded, it therefore does not contain or form part of an intellectual property protected feature. As a result, a counterfeiter would find it relatively easy to introduce counterfeit or infringing objects or products containing or using the coded image into the commercial stream where such objects and products are marketed and sold. For example, a counterfeiter could evaluate and ultimately determine how to identify, source and formulate the taggant, reproduce the coded security feature of the image and apply it to a copied or counterfeit object or product and then introduce such object or product into the commercial stream.

Alternatively, a counterfeiter could evaluate and ultimately determine how to decode and reprogram the authenticating reader used to read the existing coded security feature of the image containing or forming part of the taggant so that it reads the counterfeiter's coded image. By adopting either or both of these approaches, a counterfeiter could successfully circumvent the authentication process or measures being used by the owner or marketer of the object or product without having infringed any intellectual property right of the owner or marketer in the object or product.

U.S. Pat. No. 8,403,223 is also directed to a Level 2 security measure and describes an authentication method for textiles containing two invisible designs having readable features and used to identify, authenticate and track textiles. However, again given that the invisible designs themselves are not, nor do they contain any, intellectual property protected features, the invisible designs serve as the only security feature for identifying and authenticating the textiles. As a result, a counterfeiter would again, find it relatively easy to introduce counterfeit, copied textiles into the commercial stream without having infringed any intellectual property right of the owner or marketer in the textiles.

SUMMARY OF THE INVENTION

The present invention provides a secure glyph comprising:
 a) an intellectual property protected feature; and
 b) a machine readable feature having an overt and/or a covert portion;
wherein said intellectual property protected feature is either recognized alone as a machine readable feature, or recognized in combination with at least a portion of the machine readable feature, by an authenticating apparatus to determine authenticity.

Furthermore the present invention also provides an object or product with a secure glyph thereon and a method of producing same comprising providing an object or product and affixing or attaching thereto, printing or coating thereon and/or incorporating therein a secure glyph as herein described above.

The present invention also provides an authenticating apparatus for determining the authenticity of an object or product having a secure glyph thereon comprising:
 a) a database containing associated data corresponding to a signal response from an intellectual property protected feature alone, or combination with a machine readable feature and
 b) an authentication reader having:

i) a signal generator capable of generating a signal response from an intellectual property protected feature alone or in combination with a machine readable feature on the secure glyph;

ii) a signal response detector capable of receiving the signal response from the intellectual property protected feature alone, or in combination with the machine readable feature; and iii) a signal processing unit (SPU) for comparing the signal response from the detector and the relevant associated data in the database.

The present invention also provides a device with an authenticating apparatus associated therewith, or incorporated therein, for use in combination with an authenticated object or product.

Furthermore, the present invention also provides a process for manufacturing a device with an authenticating apparatus associated therewith, or incorporated therein, for use in combination with an authenticated object or product, wherein the process comprises incorporating the authentication apparatus into the device.

Additionally the present invention provides a method for allowing an object or product having a secure glyph to be accepted and used for a specific intended purpose in a device, the secure glyph comprising:

a) an intellectual property protected feature; and
b) a machine readable feature;
c) wherein said method comprises:

i) using an authenticating apparatus connected to the device to detect and recognize the intellectual property protected feature alone, or in combination with at least a portion of the machine readable feature of the secure glyph on the object or product; and ii) allowing the intended use of the object or product in the device The present invention also provides a system for allowing a first article to be used in combination with a second article comprising:

a) authenticating the first article having a glyph according to the present invention thereon by detecting a characteristic feature of the glyph with a detector;

b) allowing the first article to be used in combination with the second article.

Finally, the present invention provides an authentication method for determining the authenticity of an object or product wherein a secure glyph for determining authenticity has been affixed or attached thereto, printed or coated thereon and/or incorporated therein, the secure glyph having an intellectual property protected feature; and
a machine readable feature having a covert and/or overt portion;

wherein said intellectual property protected feature is recognized either alone as a machine readable feature; or recognized in combination with at least a portion being a machine readable feature; by an authenticating apparatus to determine authenticity;

the method comprising subjecting the object or product to an authenticating apparatus having:

(i) a database containing associated data corresponding to a signal response from an intellectual property protected feature alone, or combination with a machine readable feature; and (ii) an authentication reader having: a signal generator capable of generating a signal response from an intellectual property protected feature alone or in combination with the machine readable feature on the secure glyph; a signal response detector capable of receiving the signal response from the intellectual property protected feature alone, or in combination with the machine readable feature; and a signal processing unit (SPU) for comparing the signal response from the detector and the relevant associated data in the database; and acknowledging and using the output from the authentication reader.

These and other objects, advantages, and features of the invention will become apparent to those persons skilled in the art upon reading the details of the methods and as more fully described below.

DETAILED DESCRIPTION

Figure 1:
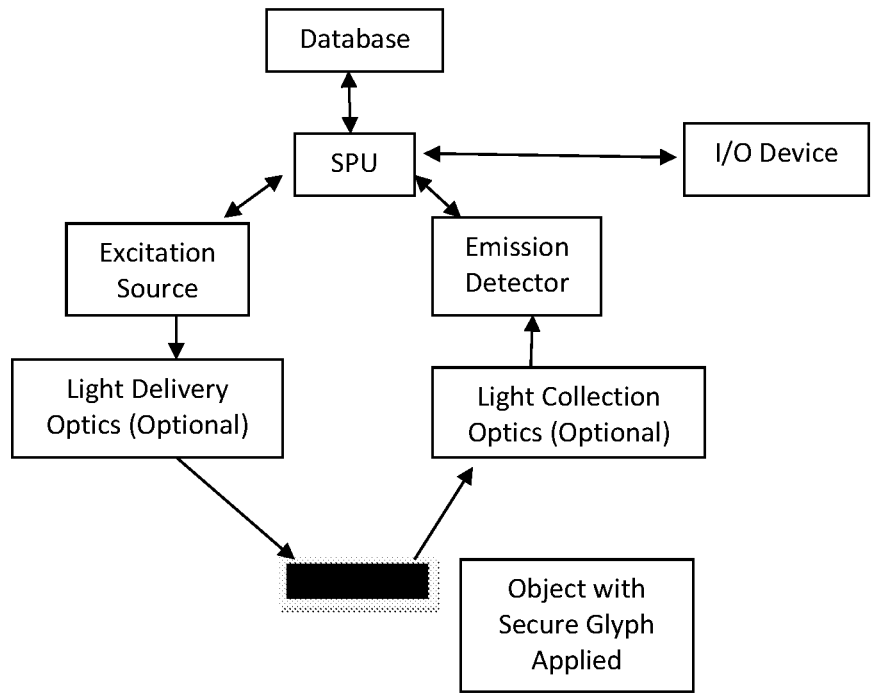
FIG. 1 shows a block diagram of an authentication apparatus according to an embodiment of the present invention.

The present invention provides a secure glyph, an object or product with a secure glyph thereon, a method of producing the object or product, an authenticating apparatus, a device incorporating the authenticating apparatus, a process for manufacturing the device, a method for authorizing and/or allowing the use of the object or product with the machine and thus a preventing or inhibiting the use of an unauthorized/non authentic object or product and an authentication method.

Attempts have been made to prevent the use of an unauthorized object or product by positioning an identifier, either on the object or product directly or on a substrate associated with the object or product such as a lid or label, which can be detected by the detector. Thus the use of the object or product is only permissible when the authentication reader recognizes the identifier.

It had previously been thought that an identifier employing a Level 2 security measure was unique and/or constituted trade secret information and could not be hacked, copied or otherwise reproduced. However, a problem arises when the identifier can be reproduced, even if periodically reconfigured or reformulated, to a required degree of accuracy to enable unauthorized producers, suppliers and/or dealers to position the identifier onto a non authentic object or product to be detected by a detector and thereby allow the use of the non authentic object or product with a device.

Furthermore even if the identifier is the subject of patent protection, such as a unique taggant formulation, it is then difficult and very involved to prove that anyone reproducing such a formulation is, in fact, infringing the patent.

The present invention solves the above mentioned problem by employing a secure glyph having a machine readable feature and an intellectual property protected feature that can be employed to prove infringement of the intellectual property feature of the secure glyph and enable the owner of the intellectual property right to prove the counterfeiting or unauthorized copying or reproduction of the object or product.

Therefore unauthorized producers, suppliers and/or dealers attempting to reproduce the secure glyph are deterred from doing so given they would immediately become liable for the unauthorized use of the intellectual property feature of the secure glyph and subject themselves to intellectual property infringement proceedings and the associated remedies upon counterfeiting, copying or reproducing and/or using the secure glyph.

Thus the present invention is capable of extending the life span of the security protection measure, such as a taggant subject to utility patent protection, afforded a trademark owner, given that in most cases, utility patent protection is limited to a 20 year lifespan, whereas trademark protection has an unlimited life. This particular aspect is advantageous given that it is not uncommon for an object or product to have a marketplace life span that exceeds the life span of any utility patent coverage for an object or product in the marketplace.

The term "glyph" as used herein defines an elemental symbol having a design feature within an agreed set of symbols, intended to represent a readable (e.g. machine readable) feature for the purposes of writing and thereby expressing or conveying thoughts, ideas and concepts. Glyphs are considered to be unique marks that collectively can add up to the spelling of a word or otherwise contribute to a specific meaning of what is written, with that meaning dependent on cultural, social and/or societal usage.

The term "secure glyph" as used herein defines an element that has an intellectual property protected feature and a machine readable feature.

Intellectual Property Protected Feature

The intellectual property protected feature is herein defined as a feature that is represented and protectable or is protected by, for example, at least one intellectual property right, such as a trademark, trade secret, copyright or a registered design.

In particular, the intellectual property protected feature of the glyph may, for example, be a copyrighted jingle that is immediately played upon interrogation of the glyph by an authenticating apparatus.

The intellectual property protected feature is preferably recognizable by at least one unassisted human sense. Thus the intellectual property protected feature may be visually recognizable with the human eye, audibly recognizable, olfactory recognizable and/or recognizable by touch. When the intellectual property protected feature is recognizable by at least one unassisted human sense it is considered to be "overt". Alternatively, recognition of the intellectual property protected feature may require the use of a detector when it cannot be recognized by at least one unassisted human sense and is thus considered "covert". The intellectual property protected feature may also comprise an overt and/or a covert portion.

In particular, the intellectual property protected feature could be a phrase or slogan that is protected by copyright, a scent, image or design protected by a trademark or a trade secret.

Usually, the intellectual property protected feature is recognizable with the naked eye and preferably is the subject of a registered trademark.

Wherein the intellectual property protected feature is a trademark the secure glyph is considered a "trademark glyph" which is a particular type of secure glyph, specifically designed to be representative of a registered trademark, trade name or logo, and that is, or is capable of being, affixed or attached, printed or coated and/or incorporated into an object or product requiring authentication.

The intellectual property protected feature and the machine readable feature may each be recognized alone, or in combination or association with each other by an authenticating apparatus to determine authenticity of the secure glyph.

The intellectual property protected feature may be recognized by the authentication reader based on its shape, geometry and/or symmetry.

In a particular embodiment of the invention at least one machine readable feature is either positioned within the intellectual property protectable feature, constitutes the entire intellectual property protected feature or constitutes only a discrete portion or section of the intellectual property protected feature.

The machine readable feature of the secure glyph may also have an overt portion and/or a covert portion.

Secure Glyph

In a further embodiment of the present invention the entire secure glyph may constitute an intellectual property protected feature which may be formed from a machine readable feature.

The secure glyph in its entirety may be invisible to the "naked eye" i.e. when both the intellectual property protected feature and the machine readable feature both only have covert portions or may be visible to the "naked-eye" i.e. when either the intellectual property protected feature and/or the machine readable feature have at least one overt portion.

Furthermore the secure glyph may be any geometrical form or pattern such as a mark, trademark, logo, character, alphanumeric, drawing, picture, semiotic, pictogram, hieroglyph, symbol, image, geometric object and/or an embossed or deformed area.

The secure glyph design typically has a sufficiently high degree of rotational symmetry, also known as "n-fold rotational symmetry" such that the position of the secure glyph is not critical to its recognition.

Wherein the authentication reader is capable of reading only a single pixel or very few pixels of information, then the secure glyph would require an infinite number of degrees of rotational symmetry, such as a circular dot or ring, whilst the authentication reader is capable of reading 2 or 3 pixels could reliably recognize a regular hexagon, which would have six degrees of rotational symmetry.

Preferably, the secure glyph has at least 3 degrees of rotational symmetry, more preferably at least 4 degrees of symmetry and advantageously at least 6 degrees of rotational symmetry.

Thus in one embodiment of the present invention the secure glyph comprises a plurality of features of sufficiently high degree of rotational symmetry such that one or all may be read by the authentication reader.

Figure 5:
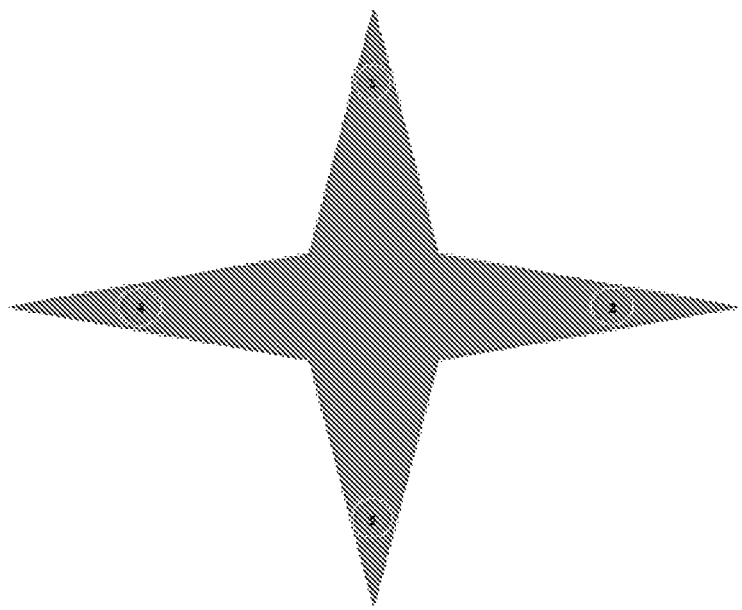
FIG. 5 illustrates a secure glyph with 4-fold rotational symmetry and four readers to identify the geometric design, its position and other graphics of the secure glyph.
Figure 6:
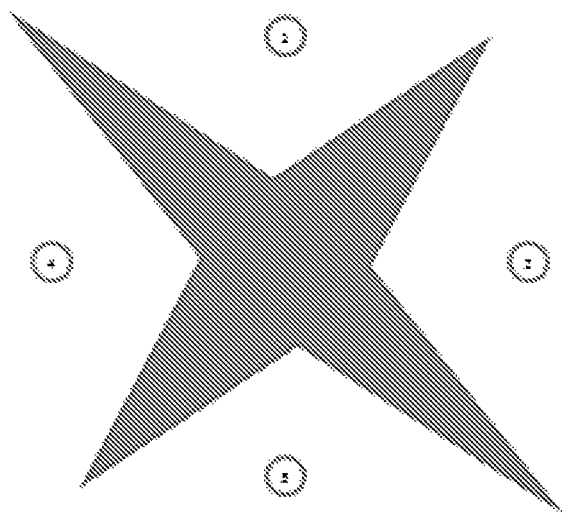
FIG. 6 illustrates a secure glyph with 4-fold rotational symmetry and four readers in which the secure glyph has been rotated to a position where the readers cannot detect the geometric design, position and other graphics of the secure glyph.
Figure 7:
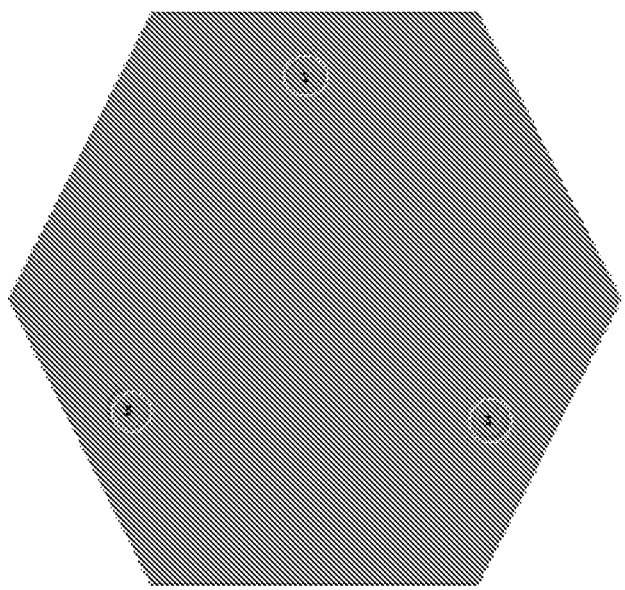
FIG. 7 illustrates a secure glyph with 6-fold rotational symmetry and three readers in which the geometric design, position and other graphics of the secure glyph are fully identified by the readers.
Figure 8:
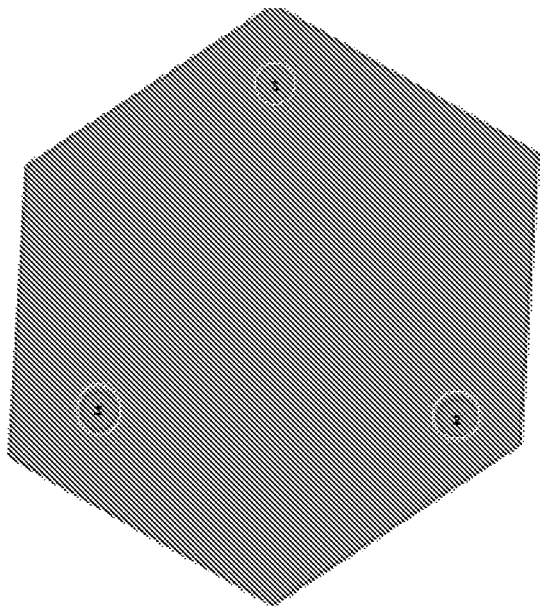
FIG. 8 illustrates a secure glyph with 6-fold rotational symmetry and three readers in which the geometric design, position and other graphics of the secure glyph are fully identified by the readers, even though the orientation is not the same as that in in FIG. 7.

Examples of secure glyphs having a regular polygonal shape are shown in FIGS. 7 and 8 whilst a secure glyph having a star shaped regular polygonal shape is shown in FIGS. 5 and 6.

Consequently a secure glyph shaped as shown in FIGS. 7 and 8 can be read at a plurality of points regardless of orientation, whereas a secure glyph shaped as shown in FIGS. 5 and 6 a positive recognition requires the correct orientation.

Alternatively the secure glyph may be designed so as to lack rotational symmetry. Secure glyphs lacking in rotational symmetry include: numbers, letters, words, marks, characters (including, but not limited to, those used to represent words in Chinese, Japanese and Korean languages), hieroglyphs (including those, for example, used to represent words in ancient Egyptian), pictograms and the like.

Authentication Reader

In one embodiment of the present invention, the authentication reader will read the entire secure glyph.

However, in an alternative embodiment the authentication reader will only read certain points or sectors of the secure glyph and this allows for a greater expression in the design of the secure glyph and for reprogramming the authentication apparatus to sample different areas of the secure glyph, either in response to counterfeiting or in response to a change in the secure glyph or another readable security feature of the secure glyph.

Advantageously, the secure glyph is provided with a means to normalize its orientation, such as an orientation mark or symbol so that the authentication reader recognizes the secure glyph in a consistent manner.

This normalization can be accomplished by providing a further reader that reads a fixed point, line or shape appearing at another location on the object or product and providing a means to compute the relative orientation and location of the secure glyph by coupling the readings together.

Furthermore, the secure glyph may consist of a physical structure that exhibits different heights from the surface of the object or product, a so-called 3D effect and the reader detects the location of the secure glyph at varying heights above the surface of the object or product.

One non-limiting example of this embodiment is a concave mirror (circular, paraboloidal or elliptical) which, when interrogated with light, will have the property of refocusing said light back to a point or to a line. Another non-limiting embodiment is a microlens array that when interrogated with light, particularly, but not limited to the visible wavelength light, there will be a definite reflected pattern of light that may be used both to authenticate and to visualize the secure glyph.

Machine Readable Feature

The machine readable feature is typically selected from upconverters, downconverters, infra-red radiation absorbers, quantum dots, RFID antennae, fluorescent compositions, liquid crystals, electro-kinetic materials, thermochromic materials, photochromic materials, piezochromic materials, sonochemicals, magnetic materials such as ferromagnetic, antiferromagnetic, ferrimagnetic, and paramagnetic materials, combinations of dyes or pigments readable by multispectral imaging, materials readable by Raman spectroscopy and combinations thereof.

Preferably, suitable machine readable features may be formed from materials such as fluorescent dyes, pigments, nano particles that are visible or invisible in natural or room light, dyes such as silicon 2,3-naphthalocyanine bis(trihexylsilyloxide), and/or other metal complexed naphthalocyanine compounds, and/or other cyanine, naphthocyanine or phthalocyanine dyes; glass encapsulated nanoparticles such as CdTe, CdSe, PbS, PbSe, InAs; phosphors such as YAG: Nd, $Al_2O_3$:Nd, and/or various other phosphor based IR active nanoparticles.

Advantageously, the machine readable feature is preferably made of fluorescent taggant materials that produce an emission spectrum or signal response when the secure glyph is exposed to a certain excitation source, such as electromagnetic frequencies, e.g. X-ray, UV (Ultraviolet) light, visible light or IR (Infrared) light. The emission spectrum may be in the UV, visible or IR spectral ranges.

The material or materials for the machine readable feature may be organic or inorganic and may be a solid, such as a powder, a liquid, and/or a solid dissolved in a liquid or form a suspension or dispersion in a liquid. Each fluorescent taggant material will have its own characteristic excitation pattern and emission spectrum.

A combination of secure glyphs using different materials, in different ratios, having, for example, different characteristic excitation patterns and emission spectrums, or the cascade of the emission spectrum of one secure glyph to excite the emission spectrum of a second secure glyph may also be used as the machine readable feature.

As a further example, a mixture of materials for the machine readable feature may have the same or different excitation wavebands and thus when a mixture of taggant materials is used, not only are the individual emission peaks of each material considered, the whole spectrum profile for that particular mixture is also important.

Thus, even for a single peak emission, emission amplitudes of neighboring wavelengths may also be measured and taken into account. In addition, for some fluorescent taggant materials, employed in the invention, the dynamic characteristics of the emission, such as the emission response time and decay time may also constitute a significant secure glyph verification criteria.

Machine readable features of the secure glyphs that are covert, i.e. invisible to the naked-eye, include irreversible thermochromic or photochromic taggant materials. These taggant materials are typically interrogated by irradiation using a reader having a suitable and appropriate type of heat or light source that would render the secure glyph visible to the naked-eye due to a physical change in the state or property of the taggant material.

Typically, secure glyphs that are invisible to the naked-eye include ultraviolet-active photoinitiators. Together with an ultraviolet-crosslinkable component incorporated therein these taggant materials, upon irradiation with a suitable and appropriate ultraviolet light source, become visible to the naked-eye as a result of the photoinitiation and the change in the refractive index of the taggant material.

Furthermore, secure glyphs that are invisible to the naked-eye and, interrogated by a reader singularly or in a plurality of ways or having more than one type of readable features, may be formed from rare earth oxides or sulfides. These taggant or other types of machine readable materials, when interrogated by electromagnetic radiation display both upconversion and downconversion readable properties. A non-limiting example of a secure glyph displaying down conversion properties would be a combination of a colored pigment having unique spectral characteristics with a Raman-active secure glyph such as that described in U.S. Pat. No. 6,610,351.

It will be appreciated by one of ordinary skill in the art that incorporating a taggant material into a secure glyph that provides for a change in the reader visualization of the secure glyph during interrogation, need not be the sole security or authenticating feature offered by the secure glyph.

The secure glyphs of the present invention may be interrogated by an authentication reader in more than one manner, e.g. either as a singular secure glyph or plurality of secure glyphs or by incorporating one or more of the above-mentioned taggants into the secure glyph.

In a further embodiment of the present invention, there may be one or more secure glyphs present on the object or product which may be the same or different in their design or in the type of secure glyph or readable security feature each possesses.

Furthermore at least one additional secure feature may be positioned on or in association with the object or product.

In particular the at least one additional secure feature may be a second secure glyph or it may be a secure feature interrogatable by the same or different means as the first secure glyph. The additional secure feature may be read by the same reader as the secure glyph or it may be read by a second device either remote from or integral to the first reader.

One advantage of this particular embodiment is that a counterfeiter of the secure glyph will not be able to use counterfeit object or product because the authenticating apparatus will still recognize the object or product as non-authentic. It will be appreciated that the authenticating apparatus may be configured, under these circumstances either to overall reject the object or product as non-authentic, or to accept the visualization of the counterfeited secure glyph, and so display the trademark or other intellectual property comprised in the secure glyph. This would render the counterfeiter an unauthorized user of a trademark or other intellectual property associated with the glyph.

Method for Producing Objects or Products

The present invention also provides an object or product with a secure glyph thereon and a method of producing the object or product.

The object or product is typically a beverage dispenser cup, a lid, cover or label.

The secure glyph may be incorporated into the object or product during its manufacturing process by mixing a taggant material used to form the machine readable feature of the secure glyph into the raw materials of the object or product and thus the machine readable feature becomes an integral part of the object or product.

In particular, when the taggant material used is a powder, it may be mixed with plastic beads, fillers or adhesives or incorporated into substrates such as textiles, woven fabric, non-woven fabric, thread fibers, cardboard, concrete, polymer, glass, wood, paper (including currency, certificates, licenses, identification cards, and passports) metal, plastic, ceramic, cloth and leather.

Alternatively, the secure glyph may be embossed onto an object or product, or attached to the object or product with an adhesive.

Preferably the secure glyph is printed or coated onto the surface of an object or product using a printing ink, paint, epoxy or lacquer.

A combination of the above-mentioned application techniques may be employed.

Authentication

The present invention also provides an authenticating apparatus which comprises a database containing data that corresponds or is associated with a signal response generated from an authentic intellectual property protected feature alone, or in combination with the machine readable feature and an authentication reader.

Preferably, the authentication apparatus includes an output device and advantageously a display unit.

The authentication reader comprises a signal generator capable of generating a signal response from the intellectual property protected feature alone, or incombination with the machine readable feature, a signal response detector capable of receiving the signal response from the intellectual property protected feature alone, or in combination with the machine readable feature and a signal processing unit (SPU) for comparing the signal response from the detector and the stored signal response in the database.

The authentication reader plays a critical role in the authentication method, as it acquires information from the secure glyph and conducts an analysis, based on the acquired information, to authenticate the object or product.

Advantageously, the acquired information may be stored in the database and may also be communicated e.g. via the internet to the brand owner of the object, or any other legitimate interested party. Furthermore the information obtained by the brand owner or other legitimate interested party may be analyzed and advantageously used to teach the authenticating apparatus improved means of recognizing the authenticity of the secure glyph on the object or product.

Additionally, the acquired information may also be used to provide a response signal to a communication device associated with the user of the object or product, such as sending a text message via Bluetooth to a smartphone informing them of a prize they have won, or directing them to a website of particular interest.

In one particular embodiment of the invention the authentication reader may detect and recognize a signal response that is representative of the entire intellectual property protected feature of the secure glyph and thus the authentication reader is considered to be in possession of the secure glyph and thus in possession of the intellectual property protected feature as well.

This is the case, for example, wherein the machine readable feature of the secure glyph is, in itself, in the form of a trademark and when the authentication reader reads the secure glyph it is also reading and using the secure glyph as the trademark that appears on the object or product.

Alternatively, the authentication reader may detect and recognize a signal response that is associated with the intellectual property protected feature and which is then compared with associated data (such a signal response) in the database whereupon the entire intellectual property protected feature of the secure glyph is generated and thus only the authentication apparatus as a whole is considered to be in possession of the secure glyph and the intellectual property protected feature.

Advantageously, in both scenarios, the intellectual property protected feature can optionally be displayed on a display unit of the authentication apparatus, which may be remote or local to the location of the secure glyph itself.

The signal generator of the authentication reader includes an excitation source that usually provides at least one light source such as a UV and/or an IR light source.

Furthermore the signal generator may include an excitation delivery source, such as light optics, a focusing lens, color filters, reflectors and optical fibers for optimized delivery to the detector.

The signal response detector of the authentication reader may include a multispectral image analyzer (hyperspectral image analyzer) capable of analyzing light from the visible and non-visible portions of the electromagnetic spectrum.

Preferably, the multispectral analyzer is an RGB (red, green, blue) sensor, used to collect the RGB components of the signal response.

Figure 2:
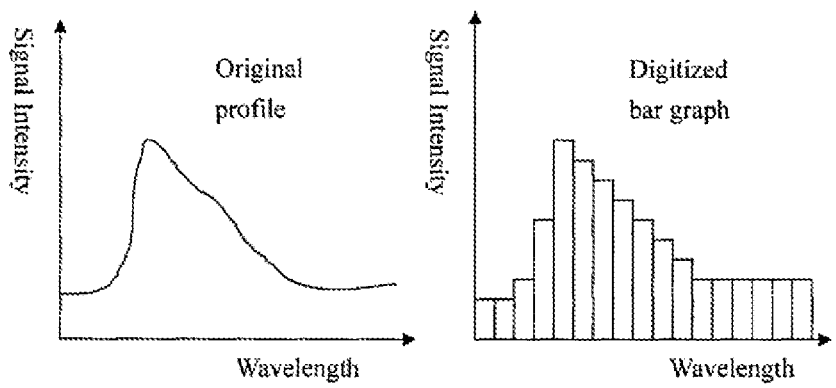
FIG. 2 shows a spectral curve with an analog signal converted to discrete digital values.
Figure 4:
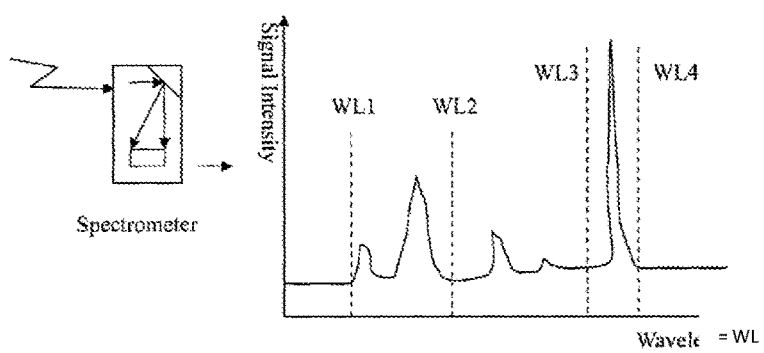
FIG. 4 illustrates the spectral range to scan in order to identify a specific taggant material. In this illustration there are 2 taggants one scanning from WL1 to WL2 to read taggant 1 and one from WL3 to WL4 to read taggant 2.

The RGB sensor has output channels for the R, G and B components and the total signal intensity (W) and provides the color of the signal responses and the total signal intensity to indicate signal concentration as illustrated in FIGS. 2 and 4. The sensor output can either be in voltage, current or pulse frequency format.

Furthermore the RGB sensor provides for three progressive levels of security in the analysis of the RGB signal emission profiles namely, the wavelengths where the emission intensity peaks, the peak wavelengths and the relative amplitudes of the peak emission intensity wavelengths and the peak wavelengths of the relative intensity amplitudes at the peak wavelengths and amplitudes of the emission intensity at "all" wavelengths.

The emission intensities over the complete emission spectrum may be digitized to form a bar graph where the amplitude and the width of each bar is recorded and used for analysis of the signal response by the SPU. Where the complete emission spectrum for a secure glyph in the visible range is obtained, the emission color can also be calculated to serve as an additional authentication characteristic of the secure glyph. In addition, a fast response spectrometer can be set to be proportional to signal emission intensities to give one more dimension to the authentication algorithm.

Yet another layer of authentication protection may also be provided by using a response time RGB sensor wherein one can record the response time (rise time and/or decay time) of the signal response and set it as another authentication readable feature criteria. In such an embodiment, the database record would contain data for a particular secure glyph's name-RGB values, intensity, decay time-product information.

Figure 9:
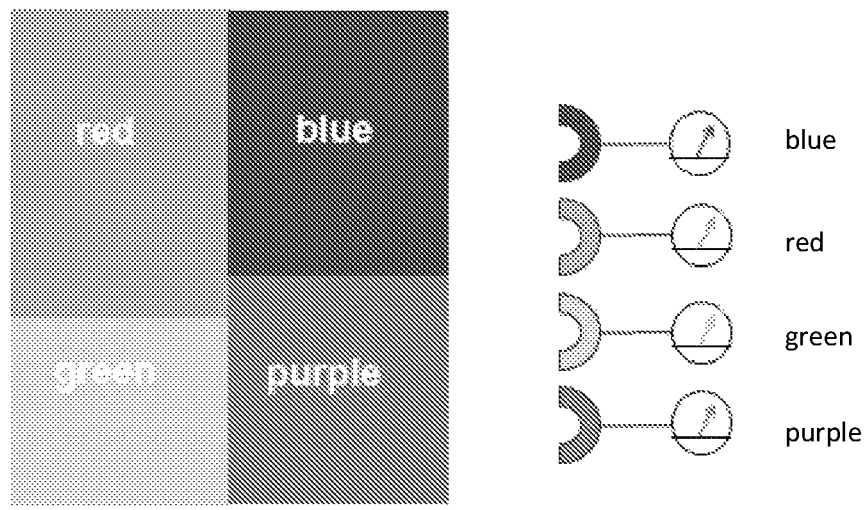
FIG. 9 shows a secure glyph having four colored areas and four color-selective readers. The signal response for each reader is proportional to the area of the secure glyph of a specified color, when the glyph is interrogated with four separate wavelengths of light and read by a reader, camera, spectrophotometer or the like capable of distinguishing those four wavelengths of light.
Figure 10:
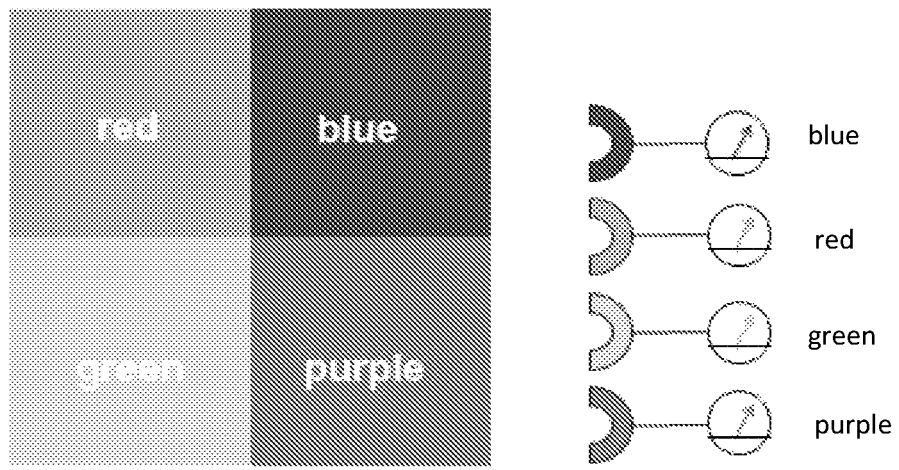
FIG. 10 shows a secure glyph having four colored areas and four color-selective readers. The signal response for this secure glyph, and thus the presence or absence of any rotational symmetry of this secure glyph (that is to say, does it appear as a single square of fourfold rotational symmetry or as four conjoined squares of no rotational symmetry) may be different depending upon which wavelength(s) of light are used to interrogate the secure glyph.

When the secure glyph is visible to the naked-eye such as multi-colored glyph, then the intensity of the color signals emitted from the secure glyph can also be used to identify the secure glyph. The reflected light intensity will be proportional to the area of the secure glyph within the aperture of the reader. Thus using three or four colored sources, such as light emitting diodes, aimed at an area of the secure glyph, the fraction of the light sensed or read will be proportional to the area of the secure glyph printed in that color. Thus, the ratio of the R to G to B response signals will form a unique identifier for the secure glyph, without having to process the complete image of the secure glyph. Such area average identification could be defined during the design of the secure glyph on a printing plate, for example, where the area or where the secure glyph or other secure materials placed on the object or product can be determined independently from the rest of the graphics on the object or product as illustrated in FIGS. 9 and 10.

In another embodiment of the present invention, a spectrometer is used as the signal response detector to provide a high level of security. The use of such a high level detector would, for example, avoid the problem of metamerism. The signal response may have output signal intensity in a wide range of wavelengths and a resolution ranging from several nanometers to less than 1 nanometer. The use of a spectrometer also allows the complete emission spectrum profile to be obtained. The selection of the spectrometer (over applicable wavelength range, sensitivity and resolution) will depend on the physical and chemical properties and features of the taggant materials used to form the secure glyph and the signal emission wavelengths required for authentication.

In an embodiment of the present invention where a spectrometer is used, the spectrometer can have a wavelength dispersive element, able to detect the complete response spectrum for the secure glyph. The data output of the spectrometer can be in the form of the relative intensities versus wavelengths, where the emission peaks are recorded and naturally become the fingerprint of the readable security feature for the secure glyph.

In another embodiment of the invention provides object or product authentication wherein the secure glyph is covert, for example, using a printing ink, and generates a fluorescent signal response that results from being excited by an ultraviolet or infrared excitation source. The signal response generated will be in three different colors. The authentication reader will typically perform at least three different spectral characteristics, either by nature (such as an LED being connected as photodiode) or by the addition of a color filter that matches the signal response of the fluorescent colorants used in the taggant material to formulate the secure glyph.

The signal response detector is configured to send a signal response to the SPU. After receiving the signal response, the SPU performs a diagnostic analysis and retrieves the related secure glyph property data from the database and compares this with the signal response received from the signal detector.

The results of the comparison are then typically sent to an output device which allows the machine to function or prevents the machine from functioning. Preferably the output device includes display unit which provides notification to a user of the result either audibly, preferably visually.

The analysis hardware and output device may be a desktop or notebook computer. Furthermore the output device may be a standalone mobile application device (field type), having analysis hardware, an SPU and associated electronic circuitry. The output could appear on a small liquid crystal display panel, or other type display. The database may either be built-in to the authenticating apparatus or be connected to the apparatus via a wired or wireless means, such as the internet or an intranet.

The authenticating apparatus may also include one or more input devices for the user to input commands to direct or interact with the authentication apparatus. The format for the data representing the signal emission will depend on the signal emission detection device used.

The authentication reader may further generate an output, which can be connected to an SPU configured for outputting the result of the authentication, to a manufacturer or user of an article, object or product subject to the authentication. The reader may, for example, upon failing to authenticate a trademark glyph affixed to an article, object or product, send a command to the authentication apparatus to cause the, object or product or a device using the article, object or product to cease functioning.

It will be appreciated that the value of this authentication reader functional aspect where a user of a counterfeit, object or product is attempting to force the use or acceptance of the counterfeit, object or product. The loss stemming from any failure to use the object or product or any article or device associated with the object or product can cause a user to contact the manufacturer in order for the object, product, article or device to become functional again.

By such a means, the manufacturer of the object, product, article or device can limit counterfeiting and develop data on the counterfeiting. Thus the lock-out and reporting aspect for the authenticating apparatus and method of the present invention can be commercially valuable for ink jet cartridges, pharmaceuticals, vaccines, beverages and beverage and vending dispensing machines and many other industrial articles, items and machines of various types.

In a further embodiment of the present invention, the authentication reader may be designed to read and, optionally, visualize the secure glyph and additionally have the capability to read numerous pixels of information thereby capturing the shape and orientation of the secure glyph.

The visualization could be provided by a miniature camera that is either monochrome, or full color. In one particular embodiment, where the entire geometric shape of the secure glyph is visible to the naked-eye using a camera, there is no requirement that the secure glyph be designed to have rotational symmetry. Furthermore the camera captured image can be rotated or processed using mathematical procedures and image processing.

Additionally, another layer of authentication protection is gained when the total signal intensity of a signal response serves as an additional verification criteria relating to the concentration of the taggant material forming the secure glyph. Therefore, for a certain object or product, one may simply double such concentration to make a difference in the readable features of the secure glyph.

The present invention also provides a machine with the above mentioned authenticating apparatus incorporated therein or associated therewith.

The machine could be an injet printer, a vending machine or a brewing machine.

The present invention also provides a method for allowing for an object or product having a secure glyph thereon to be accepted and used for a specific intended purpose in a machine associated with the authenticating apparatus as herein described above.

The method involves using the authenticating apparatus incorporated within or associated with a machine to detect and recognize the intellectual property protected feature alone, or in combination with at least a portion of the machine readable feature on a secure glyph and subsequently authorizing or allowing the intended use object or product in or with the machine.

Furthermore the method may include initially affixing or attaching the secure glyph to the object or product, printing or coating the glyph onto the object or product and/or incorporating the glyph into the object or product.

The present invention also provides a system for allowing a first article to be used in combination with a second article comprising;
  a) authenticating the first article with a glyph thereon by detecting a characteristic feature of the glyph with a detector; and
  b) allowing the first article to be used in combination with the second article.

Advantageously, the glyph is a secure glyph is herein defined above.

Finally, the present invention provides an authentication method for determining the authenticity of an object or product having a secure glyph thereon comprising:
  affixing or attaching thereto, printing or coating thereon and/or incorporating therein onto the object or product a secure glyph having an intellectual property protected feature; and a machine readable feature having a covert, and optionally an overt portion; wherein said intellectual property protected feature is recognized either alone as a machine readable feature; or recognized in combination with at least a portion being a machine readable feature; by an authenticating apparatus to determine authenticity;
  subjecting the object or product with the secure glyph affixed to an authenticating apparatus to determine authenticity having a database containing associated data corresponding to a signal response from an intellectual property protected feature alone, or combination with a machine readable feature; and an authentication reader having: a signal generator capable of generating a signal response from an intellectual property protected feature alone or in combination with the machine readable feature on the secure glyph; a signal response detector capable of receiving the signal response from the intellectual property protected feature alone, or in combination with the machine readable feature; and a signal processing unit (SPU) for comparing the signal response from the detector and the relevant associated data in the database; and acknowledging the output from the authentication reader.

Figure 3:
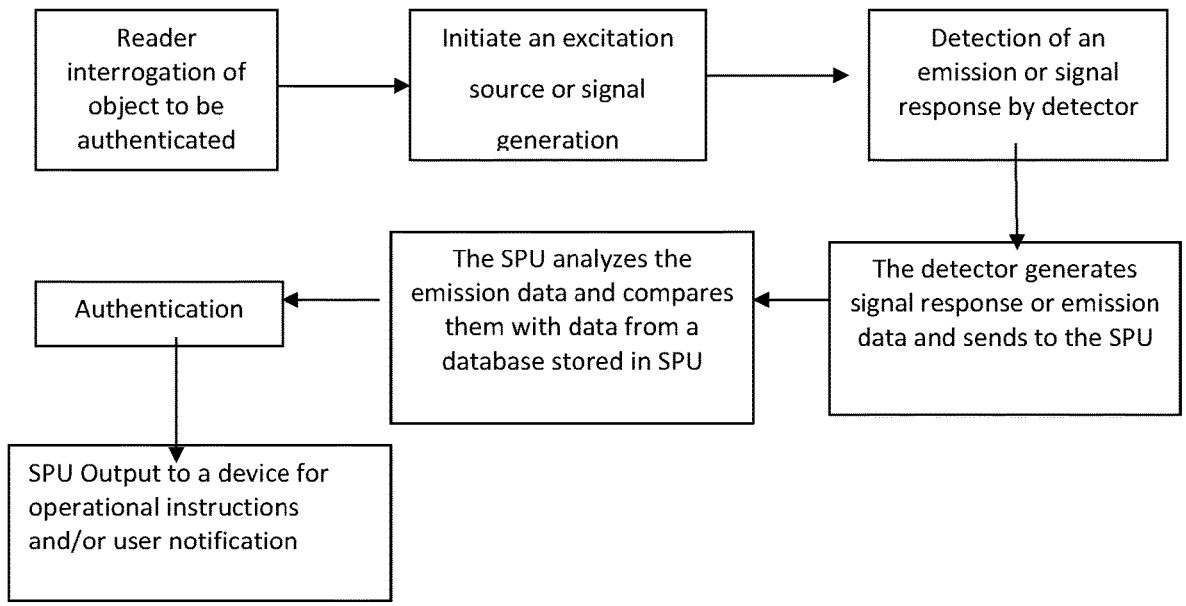
FIG. 3 shows a typical object or product authentication work flow according to a particular embodiment of the present invention.

In a particular embodiment of the present invention, the object or product authentication includes applying or incorporating a secure glyph to the object or product; a database storing data related to the signal response properties of the secure glyph; and an authentication reader having a signal generating or excitation source for emitting a signal towards the secure glyph for a signal emission or response detection by the reader, and a signal processing unit (SPU) for analyzing the signal response and comparing the signal response with the data in the database as illustrated in FIGS. 1 and 3, thereby verifying the identity and authenticity of the object or product containing the secure glyph or having it applied thereto.

The information so obtained may further either remain stored in the database or may be communicated, e.g. via the internet to the brand owner of the object. It is also a feature of this invention that the information so obtained by the brand owner may be analyzed and used to teach the reader device improved means of recognizing the authenticity of the secure glyph on the object. Another possibility is to program the reader device to seek a secondary authentication measure for the object. These features are of special utility when (a) a counterfeiter uses an authentic object of the owner, containing an authentic secure glyph, where the reader and/or human have little reason to not believe that object and secure glyph are authentic, or (b) a counterfeiter produces a close match to the secure glyph that might fool the reader and/or human into believing that the close match to said secure glyph is in fact authentic. By either of these means, false positives can be detected or avoided and the apparatus reading the secure glyph can be taught to differentiate between forgeries and authentic secure glyphs or be taught to reference some other information that has been input into the reader device to further enhance or improve its ability to recognize the authenticity of secure glyphs and the objects containing them.

The information so obtained from the data base may also, in this instance, be conveyed to the police or to another local or governmental security organization, in order to apprehend counterfeiters and eradicate counterfeiting and unlawful uses and representation of trademarks, trade names, copyrighted materials and other intellectual property.

If the readable feature of a trademark glyph for determining a counterfeit trademark that is used on or in association with an object or product is visible to the naked eye, trademark infringement could be established immediately by the owner of the object or product. If the readable feature of the trademark glyph is hidden to invisible to the naked eye, then a secondary exposure source would be required to visualize the trademark glyph at some point during or throughout the use of the object or product. A hidden or invisible trademark glyph would add yet another level of authentication security to an object or product, since it would not be immediately clear to the counterfeiter why their counterfeit object or product is being rejected and unacceptable, even though it would appear to look and function the same, and contain the same readable features as the authentic object or product. Also, a hidden or invisible trademark glyph would preferably not impede the view or appearance of any other marketing or decorative design or advertising appearing on the object or product.

The important and distinct advantage the present invention provides, is that the authentication apparatus is not only looking for the presence of a naked-eye visible and reader visible feature of the secure glyph applied on the object or product for authentication, but is also simultaneously or sequentially looking to visually identify and authenticate the secure glyph itself as, for example, a trademark, trade name or logo, where such visual identification offers another level of verification and authentication for the object or product.

In another embodiment, a secure or trademark glyph is hidden or invisible and is subsequently visualized to the naked-eye by use of a reader that interrogates the secure glyph and displays the trademark glyph on a remote analog or digital display screen associated or part of the object or product. In this fashion, the trademark glyph is still connected with the object or product it is intended to represent and provides for a secondary visual validation of the secure or trademark glyph during the authentication of the object or product containing the trademark glyph. Optionally, display of the secure or trademark glyph may be accompanied by a validating, safety or advertising message or signal, for example "authentic product" or "good to consume" or "caution when handling hot beverages", "call this number for a free sample" or a check mark or smiley face, appearing on the display screen, in monochrome or full color. Those of ordinary skill in the art will realize that other messages, codes and signals, including those that may represent monetary value, can be generated by using the secure or trademark glyph of the present object and product authentication apparatus. Further optionally, the display of a secure or trademark glyph may be used following normal use of the object to verify the remains of said object in order to derive further value for the consumer of said object, for example by proving that the object qualifies for a rebate or a gift.

In a further embodiment, the secure or trademark glyph is hidden or invisible and printed on an interior surface of an object or product. For example, the interior surface of a laminated flexible packaging material, wherein the assembly is substantially transparent through at least one surface, to facilitate a means of interrogating the hidden or invisible trademark glyph. Through at least the one transparent surface, that is also substantially transparent to visible radiation, a secure or trademark glyph comprised of a fluorescent taggant material can be subjected to excitation at wavelengths of infra-red radiation that the secure or trademark glyph absorbs. The secure or trademark glyph may also be applied as an adhesive, rather than a printing ink, on the substrate of the object or product in such fashion as to accurately represent the geometric design of the secure or trademark glyph.

The present invention has been described in detail, including the preferred embodiments thereof. However, it will be appreciated that those skilled in the art, upon consideration of the present disclosure, may make modifications and/or improvements on this invention that fall within the scope and spirit of the invention. The following examples illustrate specific aspects of the present invention and are not intended to limit the scope thereof in any respect and should not be so construed.

Example 1: Authentication of an Overt Secure Glyph on an Object

A glyph for an object was provided having an n-fold rotational symmetry of 4 and which the intellectual property protected feature was visible to the naked-eye by applying a printing ink or coating containing a taggant onto the object by known application methods.

The object was then interrogated by a handheld machine reader and authentication conducted by both the naked-eye and the reader.

Example 2: Authentication of a Covert Trademark Glyph on an Object and Use with a Machine A trademark glyph was provided having an n-fold rotational symmetry of 4 and which was invisible to the naked-eye by applying a printing ink or coating onto the lid of the single use beverage dispensing cup to create the design and form of the trademark.

The beverage dispensing cup is inserted into a beverage dispensing machine or brewer, where upon insertion, the trademark glyph becomes visible to the naked-eye. The beverage dispensing cup is then subjected interrogation by an authentication apparatus incorporated within the machine and the trademark glyph is displayed a visual display on the dispensing machine.

Upon interrogation, the beverage dispensing cup is subjected to identification and authentication by the machine reader and the process of using the beverage dispensing cup either continues or is halted based on the results of the authentication for the trademark glyph appearing on the lid of the beverage dispensing cup.

Upon authorization of the trademark glyph, the beverage dispenser continues its operation and a beverage is brewed and dispensed.

At the point where the authentication occurs and is verified, the trademark glyph causes a trademark, logo or message to appear on the display screen of the dispensing machine, and additionally a message such as 'ENJOY YOUR GENUINE BREW" or "AUTHENTICALLY BREWED" is also displayed.

The trademark, logo or message continues to appear on the machine's display screen throughout the brewing and dispensing process until completion. The spent brewing cup may then be taken to a second authentication center, where, upon presentation of said spent cup to a second reader, a rebate or prize may be offered to the holder of the spent cup. Upon non-verification of the trademark glyph, the dispensing machine does not brew or dispense a beverage and a message appears on the display screen notifying the user. The unused counterfeit beverage dispensing cup is then either deposited in a repository, or otherwise held or rejected.

Example 3: Authentication of an Overt Trademark Glyph on an Object and Use with a Machine A trademark glyph for an ink-jet cartridge for use in an ink-jet printer was provided which was visible to the naked-eye. A printing ink or coating containing a secure glyph is patterned deposited onto an ink-jet printer cartridge to create the design and form of the trademark glyph using a known application methods.

Trademark glyph design can be any shape because the ink-jet cartridges preferably may only be inserted into the printer in one way, so the orientation of the cartridge is mandated by the printer.

The ink-jet cartridge is then inserted into a printer and subjected to a means for interrogating the trademark glyph by a reader.

Upon interrogation of the trademark glyph, the ink-jet cartridge is subjected to identification and authentication by the reader and the process of using the ink-jet cartridge in the printer either continues and accepts the ink from the cartridge or does not accept the ink and the printer will not print.

Optionally, the printer may be further be disabled, either temporarily or permanently until an authentic ink-jet cartridge has been authenticated by the reader. A further option could require that a message be sent from the printer, for example, via the internet, or a digital or analog screen display, to alert the user or manufacturer of the printer about the non-verification.

Example 4: Authentication of a Covert Trademark Glyph on an Object and Use with a Machine A trademark glyph for an ink-jet cartridge for use in an ink-jet printer is designed to be invisible to the naked-eye. A printing ink or coating containing a secure glyph is patterned deposited onto an ink-jet printer cartridge to create the design and form of the trademark glyph using a known application method.

The trademark glyph design can be any shape because the ink-jet cartridges preferably may only be inserted into the printer one way, so the orientation of the cartridge is mandated by the printer. The ink-jet cartridge is then inserted into a printer. Upon insertion into a printer, the trademark glyph becomes visible to the naked eye and is subjected to a means for interrogating the trademark glyph by a reader, wherein the reader is a handheld, machine readable, or visual display, or a combination thereof.

Upon interrogation of the trademark glyph, the ink-jet cartridge is subjected to identification and authentication by the reader and the process of using the ink-jet cartridge in the printer either continues and accepts the ink from the cartridge or does not accept the ink and the printer will not print.

Optionally, the printer may be further be disabled, either temporarily or permanently until an authentic ink-jet cartridge has been authenticated by the reader. A further option could require that a message be sent from the printer, for example, via the internet, or a digital or analog screen display, to alert the user or manufacturer of the printer about the non-verification.

Example 5: Authentication of an Overt Trademark Glyph on an Object and Use with a Machine A trademark glyph for a vending machine is provided to be visible to the naked-eye. A printing ink or coating containing a secure glyph is patterned deposited onto items found in the vending machine to create the design and form of the trademark glyph using a known application methods.

The trademark glyph may optionally be an integral part of the substrates making up the items found in the vending machine, including but not limited to bottles, cans, candy, potato chips, chewing gum, etc. Preferred trademark glyph designs have n-fold rotational symmetry greater than 3 and most preferably greater than 4 for ease of readability.

The items placed in the vending machine and, upon purchase, are subjected to a means for interrogating or authenticating the items identity by a reader wherein the readable feature is machine readable.

Upon verification of the trademark, preferably the vending machine dispenses the product. Upon non-verification of the trademark glyph, preferably the vending machine does not dispense the product and may return any money paid for the product.

Optionally, the vending machine may be further disabled, either temporarily or permanently. Optionally, a message may be sent from the vending machine, for example, via the internet, to alert the manufacturer of the vending machine or the manufacturer of the dispensed goods about the non-verification.

Example 6: Authentication of an Overt Trademark Glyph on an Object and Use with a Machine A trademark glyph for a detergent pouch, such as a dishwasher or clothes washer detergent pouch is designed to be visible to the naked-eye. A printing ink or coating containing a secure glyph is patterned deposited onto the pouch to create the design and form of the trademark glyph using a known application methods.

Preferred trademark glyph designs have n-fold rotational symmetry greater than 3 and most preferably greater than 4 for ease of readability.

The pouch is placed in the dishwasher or clothes washer and subjected to a means for interrogating or authenticating the pouches identity by a reader wherein the readable feature is machine readable.

Upon verification of the trademark glyph, the washer uses the soap dispensed by the pouch and runs a cycle. Upon non-verification of the trademark glyph, the washer does not use the soap dispensed by the pouch nor does it run a cycle.

Optionally, the washer may be further disabled, either temporarily or permanently. Optionally, a message may be sent from the washer, via the internet or to an analog or digital display screen to alert the manufacturer or user of the detergent pouch about the non-verification.

Example 7: Authentication of a Covert Trademark Glyph on an Object and Use with a Machine A trademark glyph for a detergent pouch, preferably a dishwasher or clothes washer detergent pouch is designed to be invisible to the naked-eye.

A printing ink or coating containing a secure glyph is patterned deposited onto the pouch to create the design and form of the trademark glyph using a known application methods.

Preferred trademark glyph designs have n-fold rotational symmetry greater than 3 and most preferably greater than 4 for ease of readability. The pouch is placed in the dishwasher or clothes washer.

When the pouch is inserted into the dishwasher, the trademark glyph becomes visible to the naked-eye and subjected to a means for interrogating or authenticating the pouches identity by a reader wherein the readable feature is machine readable.

Upon verification of the trademark glyph, the washer uses the soap dispensed by the pouch and runs a cycle. Upon non-verification of the trademark glyph, the washer does not use the soap dispensed by the pouch nor does it run a cycle.

Optionally, the washer may be further disabled, either temporarily or permanently. Optionally, a message may be sent from the washer, via the internet or to an analog or digital display screen to alert the manufacturer or user of the detergent pouch about the non-verification.

Example 8: Authentication of a Covert Trademark Glyph on an Object and Use with a Machine A trademark glyph for a pouch or capsule suitable for dispensing a biological fluid, vaccine, pharmaceutical or a medical preparation is provided which is invisible to the naked-eye.

An adhesive composition containing a secure glyph is formulated and patterned deposited, via spot coating, on a flexible substrate, for example a polyester, to create a machine-readable trademark glyph feature invisible to the naked eye.

A preferred trademark glyph design has n-fold rotational symmetry greater than 3 and most preferably greater than 4 for ease of readability. The trademark glyph may optionally be an integral part of the substrate making up the flexible substrate.

The flexible substrate is then laminated to a second flexible substrate, for example a nylon, and the laminated sheet is then further fabricated into a pouch or capsule suitable for dispensing a biological fluid, vaccine, pharmaceutical or a medical preparation. The pouch in use is inserted into a dispenser, for example a medical inhaler or a syringe and is only capable of being punctured to yield up its contents upon authentication of the trademark glyph by a reader in the dispenser.

Upon verification of the trademark glyph, the dispenser dispenses the biological fluid, vaccine, pharmaceutical or medical preparation and upon non-verification of the trademark glyph, it disables the dispenser, either temporarily or permanently.

Optionally, a message may be sent from the dispenser, via the internet or to an analog or digital display screen to alert the manufacturer or user of the dispenser about the non-verification.

Optionally, the dispenser is provided with a display screen so that a message of authentication and any other valuable information derivable from the trademark glyph, for example the identity of a pharmaceutical and its dosage, can be displayed upon authentication. Such a system may be employed advantageously to authenticate, for example, the identity of an orally dispensed polio vaccine.

Example 9: Authentication of a Covert Trademark Glyph on an Object

A series of trademark glyphs for a vending machine are provided that are visible to the naked-eye. A series of printing inks or coatings containing secure glyphs are patterned deposited onto the items found in the vending machine to create the design and form of the two trademark glyphs using a known application methods.

Each trademark glyph comprises at least one readable feature. The trademark glyphs may optionally be an integral part of the substrates making up the items found in the vending machine, including but not limited to bottles, cans, candy, potato chips, chewing gum, etc.

Preferred trademark glyph designs have n-fold rotational symmetry greater than 3 and most preferably greater than 4 for ease of readability. The items placed in the vending machine and, upon purchase, are subjected to a means for interrogating or authenticating the items identity by a reader wherein the readable feature is machine readable. Said reader will read at least one secure feature on at least one of the trademark glyphs. It may be programmed to read both trademark glyphs or one only of them, or may be programmed to read the first trademark glyph then the other on a defined sequence of objects. Upon non-verification of a trademark glyph, preferably the vending machine does not dispense the product and may return any money paid for the product.

Optionally, the vending machine may be further disabled, either temporarily or permanently. Optionally, a message may be sent from the vending machine, for example, via the internet, to alert the manufacturer of the vending machine or the manufacturer of the dispensed goods about the non-verification. Upon verification of the defined number of trademark glyphs, preferably the vending machine dispenses the product. Upon non-verification of at least one of the trademark glyphs, preferably the vending machine does not dispense the product and may optionally return any money paid for the product. Optionally, the vending machine may be further disabled, either temporarily or permanently. Optionally, a message may be sent from the vending machine, for example, via the internet, to alert the manufacturer of the vending machine or the manufacturer of the dispensed goods about the non-verification.

Figure 11:
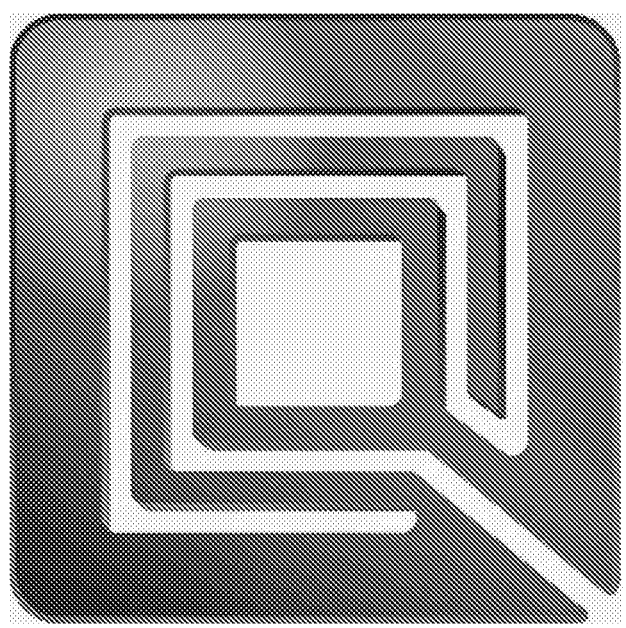
FIG. 11 illustrates a trademark glyph having three functionalities: (1) trademark function (its shape), (2) an RFID antenna function, and (3) a secure glyph function for authenticating an object or product according to the authentication system and method of the present invention.

Example 10: Authentication of an Overt Trademark Glyph on an Object and Use with a Machine A secure glyph, which also functions as a passive RFID (radio frequency identification) antenna is designed such that the intellectual property protected feature is visible to the naked-eye and have an industry common geometric shape and configuration typically seen for a standard RFID antenna (shown in FIG. 11). The secure glyph, also carries the functionality of a passive RFID antenna. The secure glyph is applied to a substrate or object as a laminated structure of aluminum or copper. Alternately, the secure glyph is formulated from a silver or copper conductive material, printed in the geometric shape and configuration on a substrate or object then cured by a standard curing method. The secure glyph is capable emitting a signal response when interrogated by a reader emitting radiation of, for example, a frequency of 13.56 MHz. Upon interrogation, the secure glyph and the object to which it is attached are authenticated by the reader. The output signal from the reader upon authenticating the secure glyph may, optionally, enable a copyrighted message, a trademark, or a trade name to display on a screen, or enable copyrighted musical notes to be played by a device interacting with the object to which the secure glyph is applied.

Figure 12:
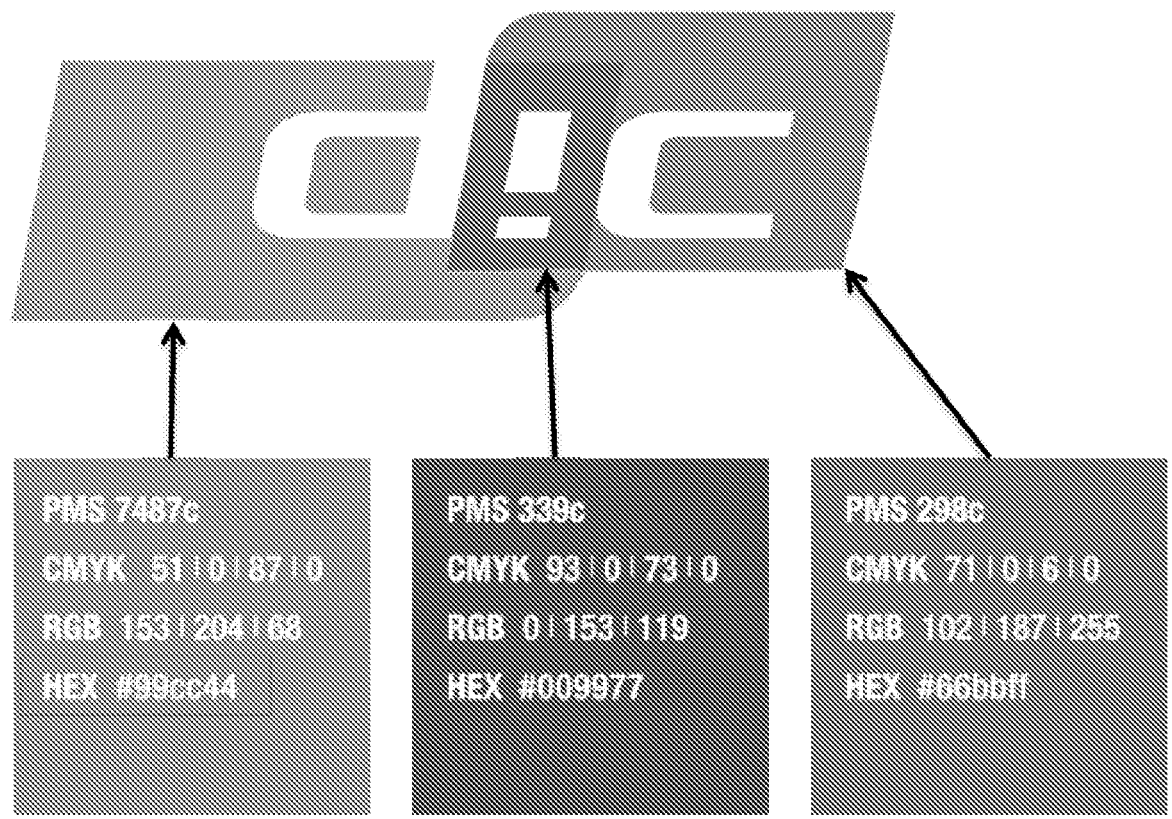
FIG. 12 shows a trademark glyph having various printed colors therein specified by known color specification systems and formed from two different printing ink formulations where at least one printing ink formulation contains a machine readable covert taggant to be read by an authentication reader.

Example 11: Production of a Trademark Glyph Containing an Overt Intellectual Property Protected Feature and a Covert Machine Readable Feature One embodiment of the present invention (shown in FIG. 12) provides a registered trademark of the DIC Corporation of Tokyo Japan as a colored trademark glyph containing a light green colored area behind the letter "d", a light blue colored area behind the letter "c" and a 2-color mixture that produces a medium blue-green area behind the letter "I".

Figure 13:
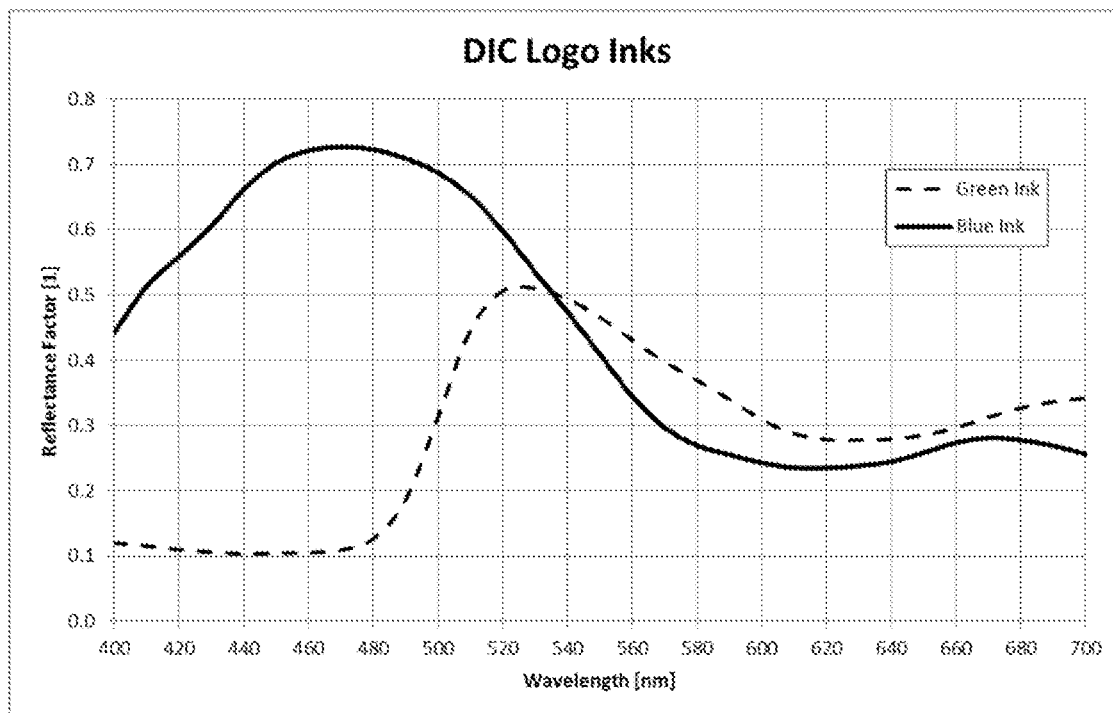
FIG. 13 shows the spectral reflectance factors for two principal colors of the printing ink formulations used to print the trademark glyph of FIG. 12.
Figure 14:
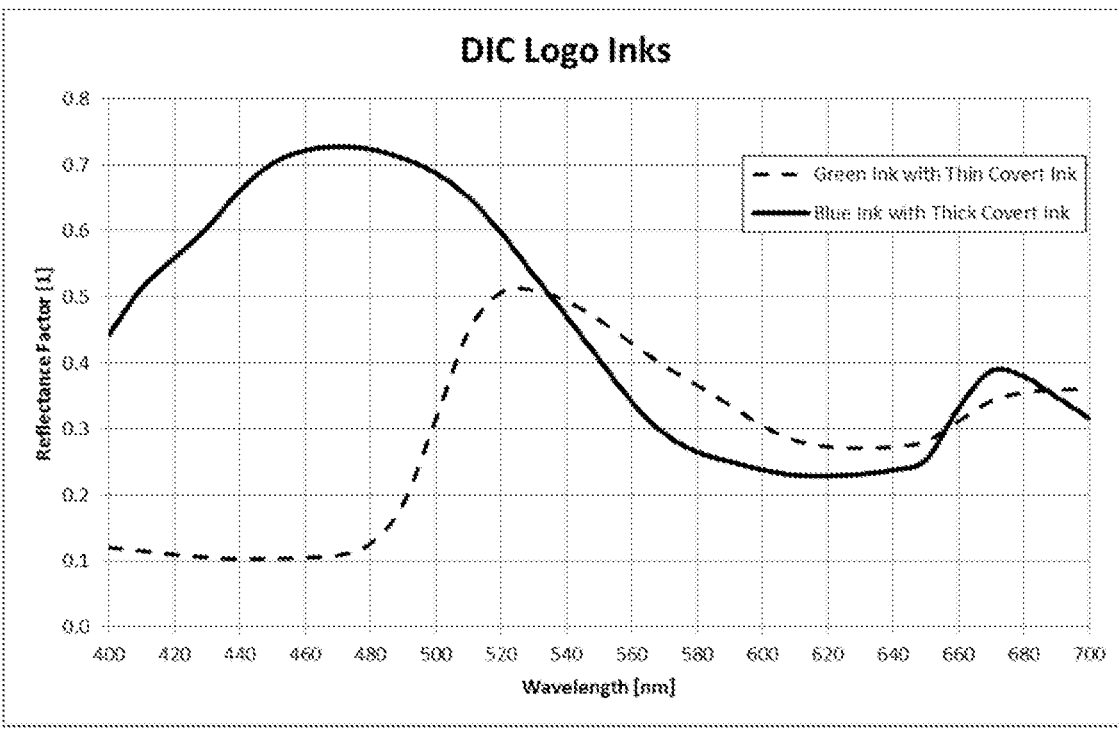
FIG. 14 shows the spectral reflectance factors for two principal colors of the printing ink formulations containing a low concentration of methylene blue as the covert machine readable taggant used to print the trademark glyph of FIG. 12.

The spectral reflectance factors of the light green color (PMS 7487) and the light blue color (PMS 298) over the visible portion of the electromagnetic spectrum for the trademark glyph were recorded (see FIG. 13). The spectral reflectance for the same two colors, overprinted with an ink containing fluorescent taggant (i.e. methylene blue) at low concentrations (so as not to markedly affect the two visual colors that downconverts, were also recorded (see FIG. 14). Each recording was made using an ISO 13655 compliant spectrodensitometer.

A small "blip" or upturn in the long wavelength tail of each color's spectral curve can be observed. This is due to the emission of the covert taggant machine readable portion of the trademark glyph and stems from when the methylene blue dye is excited with a high intensity solid state laser authenticating apparatus with a central frequency of 650 nm.

When the laser is not activated, the curves appear as they normally would. When the laser is active additional radiance is emitted from the print with the methylene blue dye and the long-wavelength "blip" signature is captured.

Figure 15:
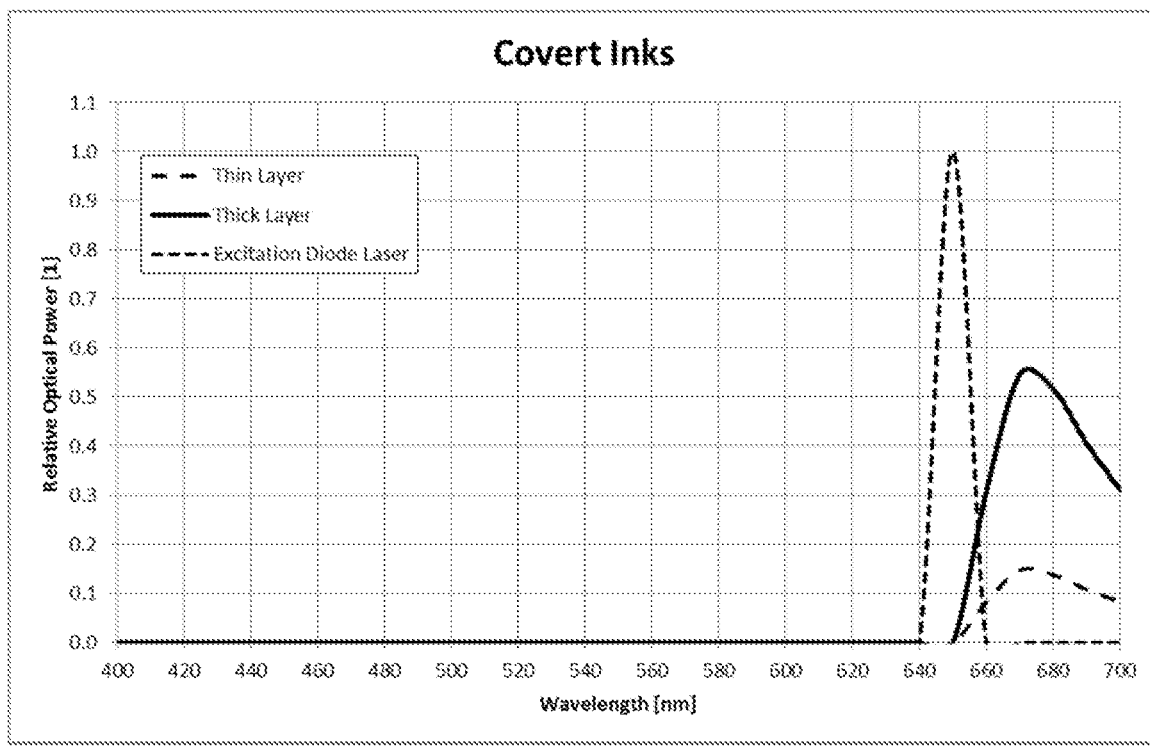
FIG. 15 shows the different emission intensities of a diode laser used to excite the methylene blue machine readable down converter taggant present in the colored portions of the trademark glyph of FIG. 12, along with two different printed film layer thicknesses for the printing ink formulations containing the taggant.
Figure 16:
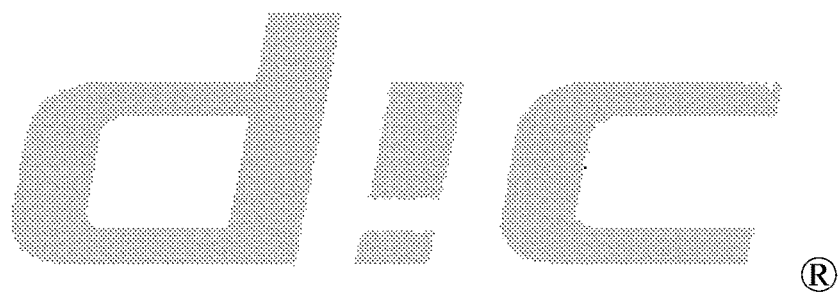
FIG. 16 shows a Level 1 security measure trademark glyph, printed with a conventional printing ink formulation. The trademark glyph is visible to the human eye and machine readable with an optical character reader or a camera used as the authenticating apparatus.
Figure 17:
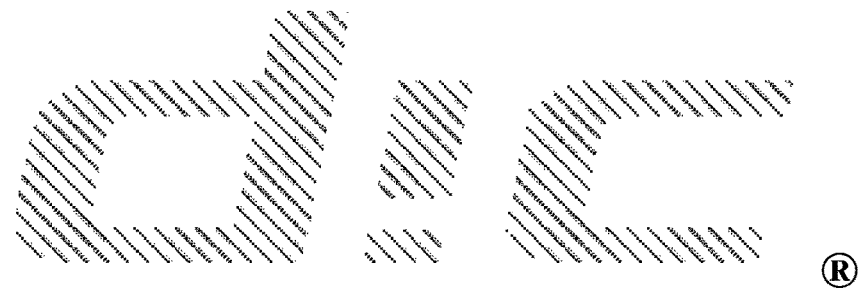
FIG. 17 shows a printed trademark glyph where the machine readable features is a printing ink formulation containing a taggant to be read by an authentication reader.
Figure 18:
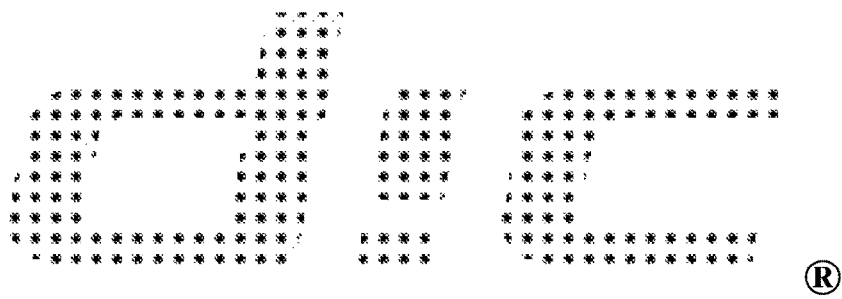
FIG. 18 shows a printed trademark glyph where the machine readable features is a printing ink formulation containing a taggant to be read by an authentication reader.
Figure 19:
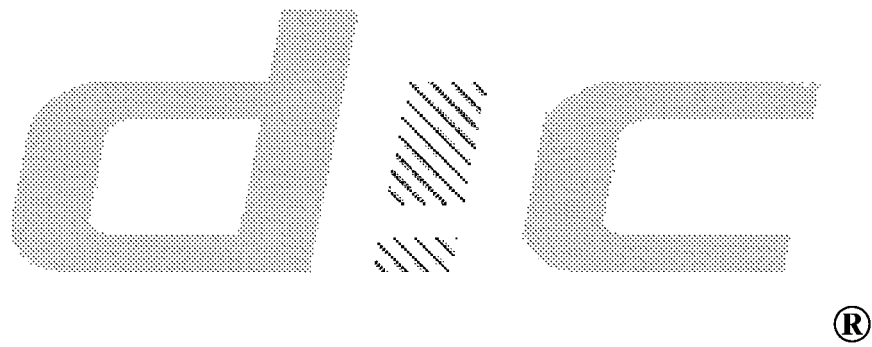
FIG. 19 shows a printed trademark glyph where the intellectual property protected feature is recognized as a combination of a conventional printing ink and a machine readable printing ink formulation containing a taggant to be read by an authentication reader.
Figure 20:
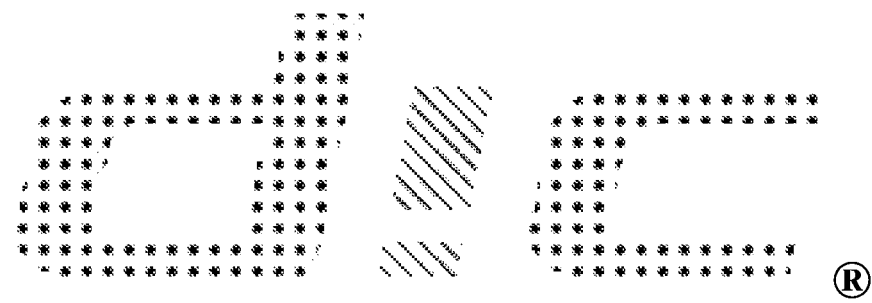
FIG. 20 shows a printed trademark glyph where the machine readable features are printing ink formulations containing different taggants to be read by an authentication reader.
Figure 21:
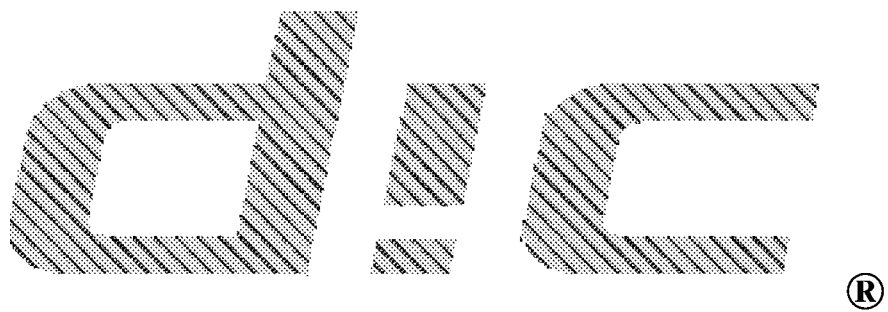
FIG. 21 shows another version of the printed trademark glyph in FIG. 19 where the intellectual property protected feature is recognized as a combination of a conventional printing ink and a machine readable printing ink formulation containing a taggant to be read by an authentication reader.
Figure 22:
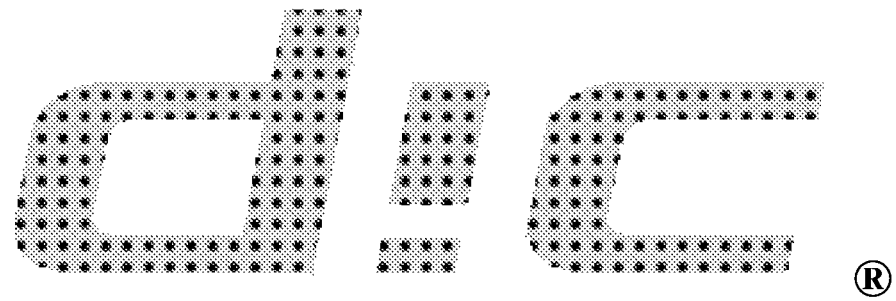
FIG. 22 shows yet another version of the printed trademark glyph in FIG. 19 where the intellectual property protected feature is recognized as a combination of a conventional printing ink and a machine readable printing ink formulation containing a taggant to be read by an authentication reader.
Figure 23:
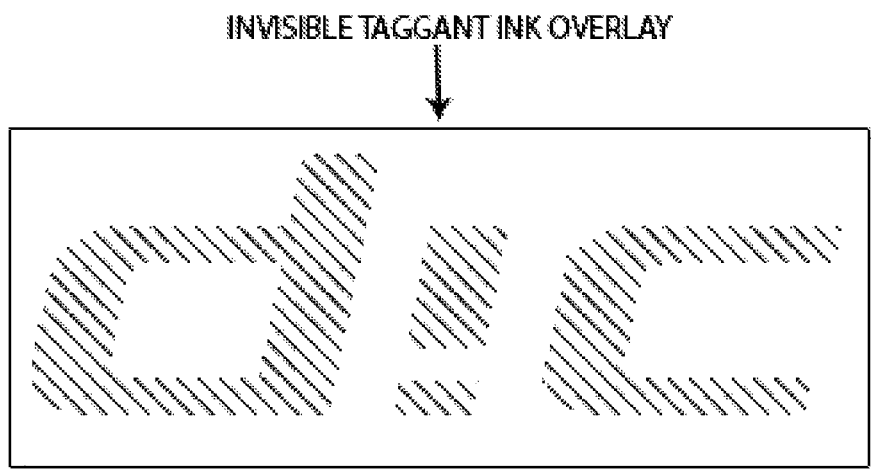
FIG. 23 shows a printed trademark glyph where the machine readable feature is a printing ink formulation containing a taggant with a taggant ink overlay.
Figure 24:
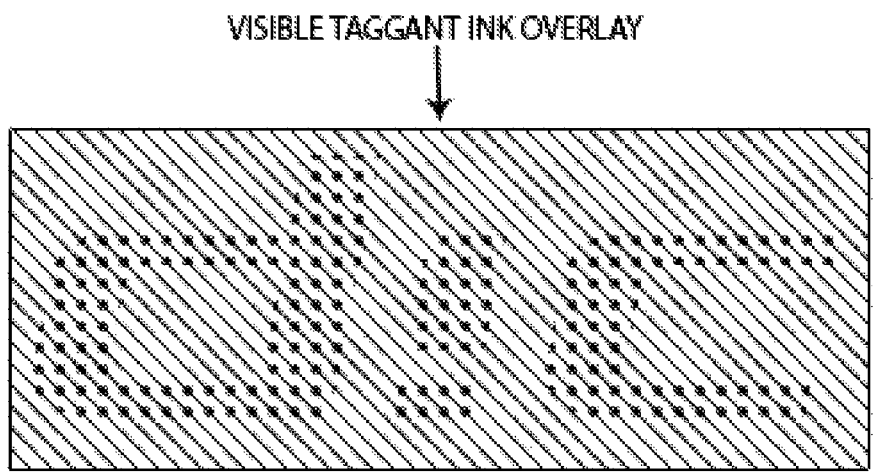
FIG. 24 shows a printed trademark glyph where the machine readable feature is a printing ink formulation containing a taggant with a taggant ink overlay.
Figure 25:
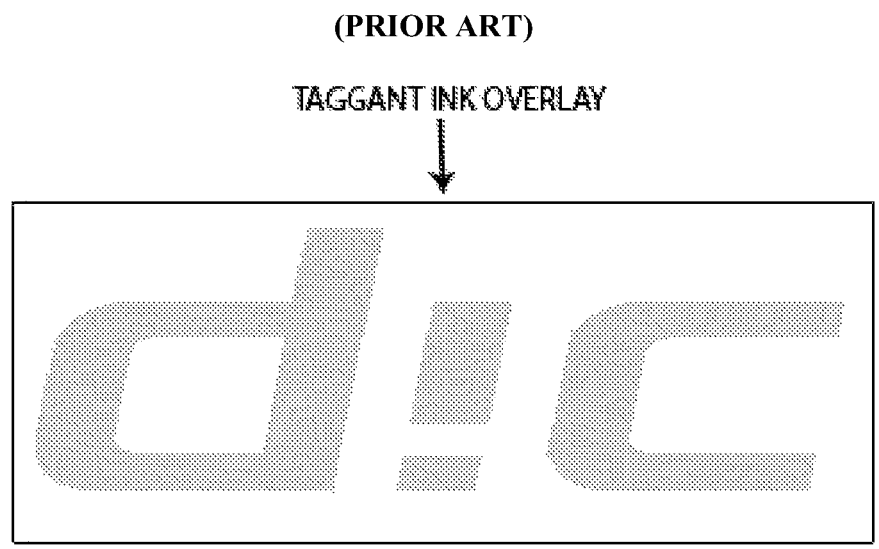
FIG. 25 represents a trademark printed by prior art techniques. More specifically, a trademark (i.e. an intellectual property feature) is printed with a conventional printing ink formulation where a machine readable overlay coating (eg containing a taggant) is subsequently applied. Therefore, the trademark itself is not printed such that it is capable of being recognized alone as a machine readable feature. An authenticating apparatus could not be used to authenticate the trademark since any machine read by the apparatus of the machine readable feature in the overlay and would not, in any way, be associated with the intellectual property protected feature.
Figure 26:
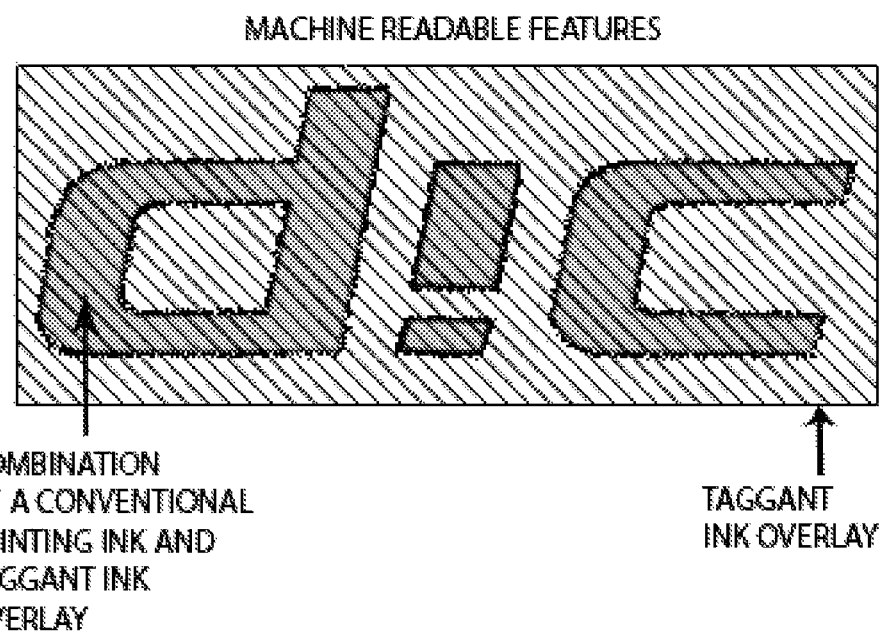
FIG. 26 shows a represents a secure glyph where the intellectual property protected feature is comprised of two distinct machine readable features: (1) a conventional printing ink overlaid with an ink containing a taggant; and (2) an ink overlay containing a taggant. The intellectual property protected feature would be recognized via a combination of the two machine readable features upon interrogation by an authenticating apparatus.
Figure 27:
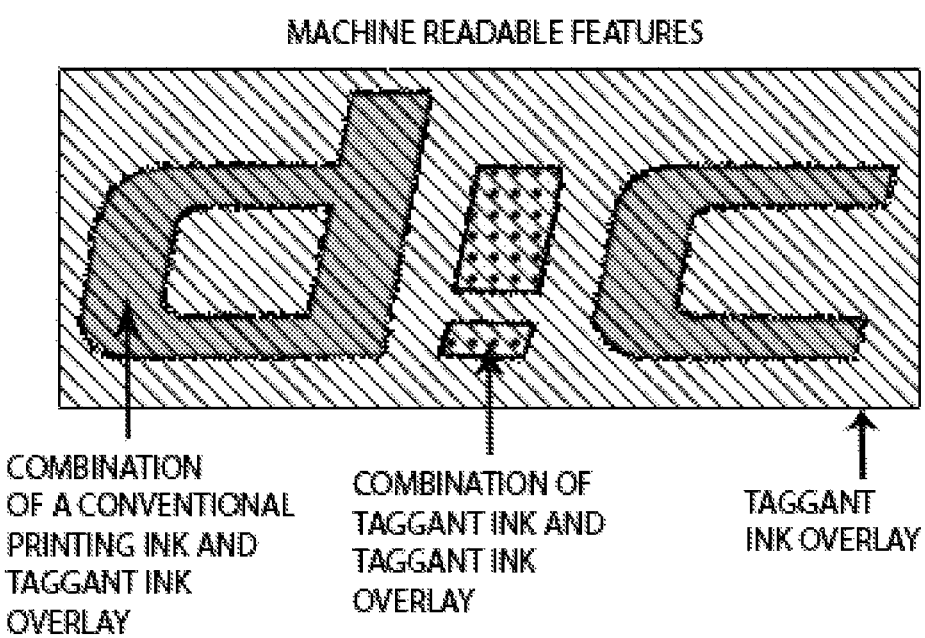
FIG. 27 shows a represents a secure glyph where the intellectual property protected feature is comprised of three distinct machine readable features: (1) a conventional printing ink overlaid with an ink containing a taggant; (2) a combination of two taggant inks used to represent a portion of the intellectual property feature of the secure glyph; and (3) an ink overlay containing a taggant. The intellectual property protected feature would be recognized via a combination of the three machine readable features upon interrogation by an authenticating apparatus.

Finally, FIG. 15 shows the radiant emission as a second machine readable feature of the trademark glyph when the spectrodensitometer source, as measured by the authenticating apparatus, is not activated wherein the location of the laser excitation being reflected and the methylene blue emission from an unprinted portion of the substrate can be clearly seen. Furthermore, two different thicknesses produce different emission intensities as fluorescence which appears as a fairly linear process, as measured by the authentication apparatus.

The example shows that a trademark glyph, according to the present invention, can be printed on an object or product and thus allowing for a method to establish and verify that the trademark was printed and used by an authorized supplier or user of the object or product.

What is claimed is:

1. An authenticating system for determining the authenticity of an object having a secure glyph thereon comprising:
   a) a secure glyph for determining authenticity comprising:
      i) an intellectual property protected feature; and
      ii) a machine readable feature having a covert and/or overt portion;
   wherein said intellectual property protected feature is recognized either alone as a machine readable feature, or recognized in combination with at least a portion being a machine readable feature, by an authenticating apparatus to determine authenticity;
   wherein the machine readable feature of the secure glyph further comprises at least 3 degrees of rotational symmetry;
   wherein the secure glyph comprises at least a first taggant material and a second taggant material each comprising a characteristic excitation pattern and emission spectrum, and wherein the characteristic emission spectrum of the first taggant material is used to excite the characteristic emission spectrum of the second taggant material in a cascade of excitation patterns and emission spectra;
   b) an object having the secure glyph applied;
   c) a database having stored data related to signal response properties for said secure glyph;
   d) an authentication reader having:
      i) a signal generating source for generating a signal response from said secure glyph;
      ii) a signal response detector for detecting said signal response, and
      iii) a signal processing unit (SPU) for analyzing the detected signal response and comparing said signal response detected with data stored in said database and authenticating said object to a user based on a result obtained by said authentication reader from the comparison between the signal response detected and the data in the database and the results of a naked-eye visualization of the glyph,
   wherein the reader further comprises an output device connected to the signal processing unit, configured for outputting the result of the authentication to a user, and allowing or disallowing an object to be used based upon such results.

2. The authenticating system according to claim 1 wherein the cascade comprises a response time and a decay time.

3. The authenticating system according to claim 2 wherein the response time and/or decay time of the cascade is used as a verification criterion.

4. The authenticating system of claim 1, wherein the signal detector comprises a multispectral imaging device, configured for outputting the multispectral imaging components and the total intensity of the light emitted by the excited readable feature material to the signal processing unit while simultaneously reading the secure glyph for authenticity.

5. The authenticating system of claim 4, wherein the signal detector comprises an RGB sensor configured for outputting the RGB components and the total intensity of the light emitted by the excited readable feature material to the signal processing unit while simultaneously reading the secure glyph for authenticity.

6. The authenticating system of claim 5, wherein the signal detector comprises an ultra-violet fluorescent light sensor, configured for outputting the emission wavelength components emitted by the excited readable feature material to the signal processing unit while simultaneously reading the secure glyph for authenticity.

7. The authenticating system according to claim 6 further comprising an output device.

8. The authenticating system according to claim 7 further comprising a display unit which may be local or remote with respect to the secure glyph.

9. The authenticating system according to claim 8, wherein the signal generator comprises an excitation source.

10. The authenticating system according to claim 9 wherein the signal response detector comprises a RGB sensor, configured for outputting the RGB components and the total intensity of the light emitted by the excited readable feature material to the signal processing unit.

11. The authenticating system according to claim 10 wherein the signal response detector comprises an ultra-violet fluorescent light sensor, configured for outputting the emission wavelength components emitted by the excited readable feature material to the signal processing unit.

12. The authenticating system according to claim 11 wherein the signal response detector comprises a spectrometer.

13. The authenticating system according to claim 12 wherein the signal response detector comprises an optical sensor.

14. The authenticating system according to claim 13 wherein the authentication reader detects and recognizes a signal response that is representative of the intellectual property protected feature of the secure glyph.

15. The authenticating system according to claim 14 wherein the authentication reader detects and recognizes a signal response that is associated with the intellectual property protected feature and wherein this signal response is compared with the associated data in the database whereupon the intellectual property protected feature of the secure glyph is generated.

* * * * *